(12) United States Patent
Kim et al.

(10) Patent No.: US 12,411,292 B2
(45) Date of Patent: Sep. 9, 2025

(54) OPTICAL MODULE FOR DATA CENTERS

(71) Applicant: LESSENGERS Inc., Pohang-si (KR)

(72) Inventors: Taeyong Kim, Gyeonggi-do (KR);
Manjae Kim, Gyeongsangbuk-do (KR);
Chongcook Kim, Seoul (KR)

(73) Assignee: LESSENGERS Inc., Pohang-si (KR)

( * ) Notice: Subject to any disclaimer, the term of this patent is extended or adjusted under 35 U.S.C. 154(b) by 107 days.

(21) Appl. No.: 18/131,377

(22) Filed: Apr. 6, 2023

(65) Prior Publication Data

US 2024/0151917 A1    May 9, 2024

(30) Foreign Application Priority Data

Nov. 8, 2022  (KR) .................. 10-2022-0148173

(51) Int. Cl.
*H04B 10/00* (2013.01)
*G02B 6/42* (2006.01)

(52) U.S. Cl.
CPC .................. *G02B 6/4248* (2013.01)

(58) Field of Classification Search
CPC .. G02B 6/4248; G02B 6/3887; G02B 6/3873; G02B 6/3897
See application file for complete search history.

(56) References Cited

U.S. PATENT DOCUMENTS

| | | | | |
|---|---|---|---|---|
| 4,779,949 A * | 10/1988 | Iri | ................ | G02B 6/3855 385/86 |
| 8,567,015 B2 * | 10/2013 | Ward | ................ | G02B 6/4471 24/122.3 |
| 9,482,826 B2 * | 11/2016 | Burkholder | .......... | G02B 6/3881 |
| 11,099,334 B2 * | 8/2021 | Okada | ................ | G02B 6/4432 |
| 11,275,217 B2 * | 3/2022 | Iizumi | ................ | G02B 6/3888 |
| 2011/0154619 A1 * | 6/2011 | Ward | ................ | G02B 6/44785 24/115 R |
| 2012/0257859 A1 * | 10/2012 | Nhep | ................ | G02B 6/3861 385/81 |
| 2012/0301085 A1 * | 11/2012 | Grinderslev | ......... | G02B 6/3888 385/136 |
| 2014/0334778 A1 * | 11/2014 | Walker | ................ | G02B 6/389 385/59 |
| 2016/0041349 A1 * | 2/2016 | Pimpinella | ........... | G02B 6/4284 385/77 |
| 2019/0049678 A1 * | 2/2019 | Koreeda | ............ | G02B 6/3817 |
| 2019/0310430 A1 * | 10/2019 | Nguyen | ............ | G02B 6/3888 |
| 2020/0049903 A1 * | 2/2020 | Okada | ................ | G02B 6/4432 |
| 2020/0400897 A1 * | 12/2020 | Hu | ................ | G02B 6/3894 |
| 2020/0408998 A1 * | 12/2020 | Iizumi | ................ | G02B 6/3857 |
| 2021/0278601 A1 * | 9/2021 | Gniadek | ............ | G02B 6/3825 |

(Continued)

*Primary Examiner* — Agustin Bello

(57) ABSTRACT

An optical module for a data center is disclosed.

Embodiments of the present disclosure provide an optical module for a data center including: an optical engine unit optically coupled to a substrate, at least one optical element, at least one electronic element, and at least one optical fiber introduced from the outside to perform a function of transmitting and receiving an optical signal; an optical cable assembly including the at least one optical fiber to transfer the optical signal transmitted to and received from the at least one optical element to the outside; a body unit configured to fix and support portions of the optical engine unit and the optical cable assembly from below; and a housing coupled to the body unit to protect an upper portion of the optical engine unit.

4 Claims, 2 Drawing Sheets

(56) References Cited

U.S. PATENT DOCUMENTS

| | | | | |
|---|---|---|---|---|
| 2021/0364715 A1* | 11/2021 | Islam | ............... | G02B 6/4219 |
| 2022/0075126 A1* | 3/2022 | Chang | ............... | G02B 6/3825 |
| 2022/0269013 A1* | 8/2022 | Iizumi | ............... | G02B 6/3849 |
| 2023/0086950 A1* | 3/2023 | Bradley | ............ | G02B 6/44528 |
| | | | | 385/78 |
| 2023/0115918 A1* | 4/2023 | Inaba | ............... | G02B 6/3878 |
| | | | | 385/78 |
| 2024/0126029 A1* | 4/2024 | Blanc | ............... | G02B 6/4206 |
| 2024/0151917 A1* | 5/2024 | Kim | ............... | G02B 6/4248 |

* cited by examiner

[FIG. 1]
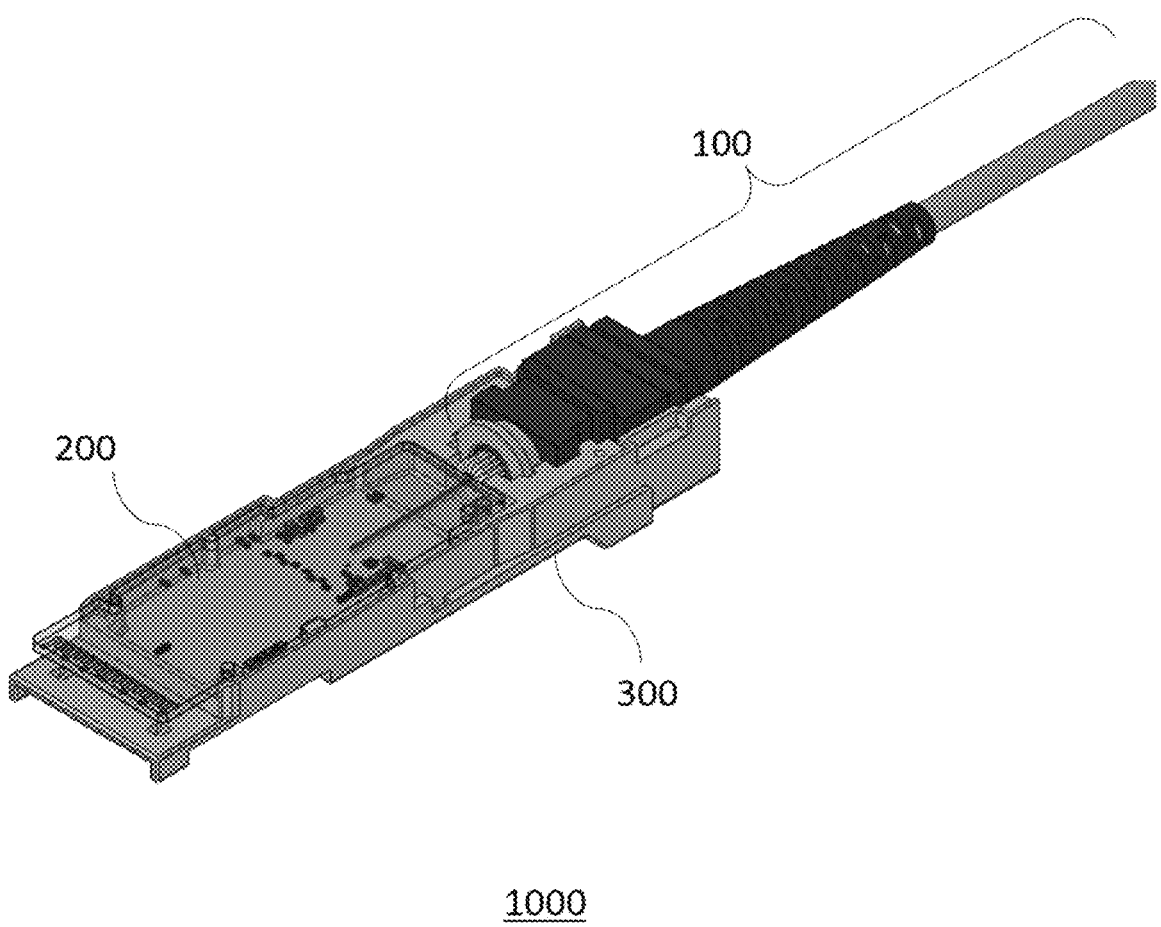

[FIG. 2]
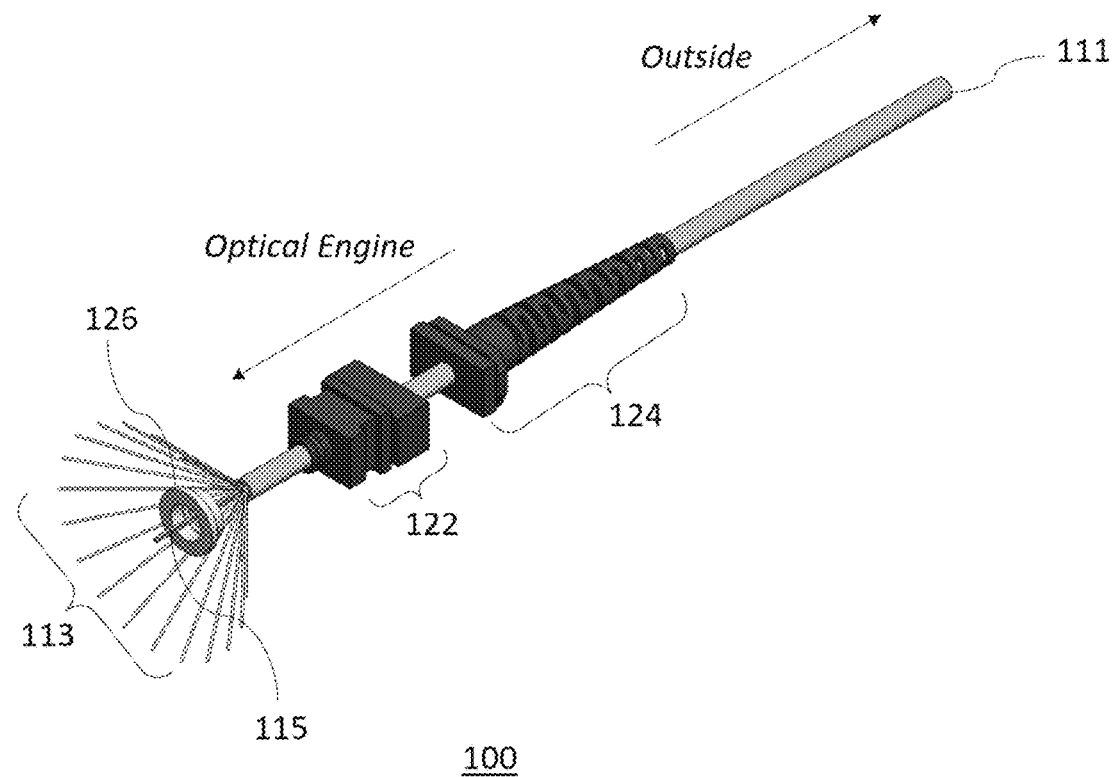
[FIG. 3]
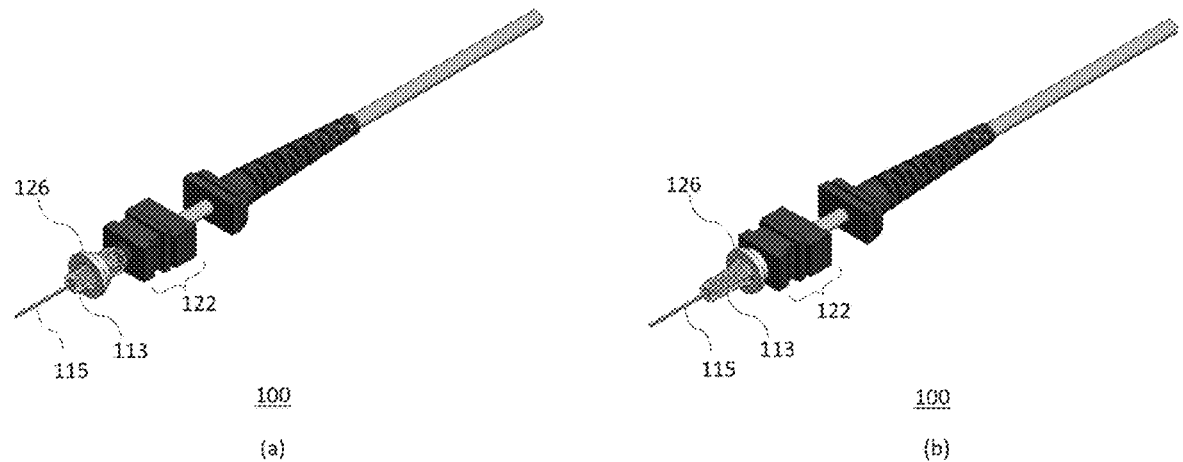

OPTICAL MODULE FOR DATA CENTERS

RELATED APPLICATION

This application claims the benefit of priority of Republic of Korea Patent Application No. 10-2022-0148173 filed on Nov. 8, 2022, the contents of which are incorporated by reference as if fully set forth herein in their entirety.

FIELD AND BACKGROUND OF THE INVENTION

Embodiments of the present disclosure relate to an optical module for a data center.

Content described in this part only provides background information for the present disclosure and does not constitute the related art.

One of methods capable of efficiently processing sharply increasing traffic in a data center is a data center optical interconnect solution, that is, expansion of an optical module for a data center. An applicable region of the optical module is gradually widened according to development of optical communication technology and an increase in data traffic. The common goals of various standards adopted for optical connection solutions are high speed, high bandwidth, and high density of data.

According to the trend of the high speed, the high bandwidth, and the high density, since a technical difficulty and a burden due to adoption for the optical module are also increasing, and the optical module also occupies the second largest portion after a server in costs consumed to constitute the minimum unit data center, securing and innovating a technology for mass production of optical modules are very urgent.

There is a small removable module such as a quad small form-factor pluggable (QSFP) module or a QSFP double density (QSFP-DD)/octal small form-factor pluggable (OSFP) module which is the most popularly used type among physical interfaces adopted in a data center. This removable module is used in a short-range data center connection cable, and is also used in an optical module for transmitting and receiving a long-range optical signal at a distance of tens of kilometers away.

An optical module for a data center specified as an optical transceiver is classified into a short range (SR), a DR, an FR, a long range (LR), or the like according to an optical signal transmission distance (reach), a physical medium dependent (PMD) type, and the like, transmits and receives an electrical signal with a host device such as a switch/server or the like, and transmits and receives an optical signal with an optical module at the opposite side connected thereto through an optical cable. In this case, an optical link between two optical modules is formed as an optical cable called a patch cord is physically/mechanically fastened to an optical connector which is present in each of the optical modules.

The presence of the optical connector helps a cabling work, but has disadvantages of adversely affecting signal quality of the optical link itself and making installation and maintenance difficult. One of types of the optical modules which can overcome these disadvantages is an active optical cable (AOC).

The active optical cable is a product including a pair of optical transceivers and an optical cable which connects the pair of optical transceivers in a permanently fixed form. When the optical link is configured using the active optical cable, since the optical cable is fixed to two optical modules, a longitudinal cross-section of the optical connector which is sensitive to dust need not to be inspected or managed, and a plurality of discontinuous optical connection points capable of lowering optical signal integrity can be excluded, signal quality improvement of the optical link itself can also be expected.

However, in the case of the active optical cable, since the optical cable is included in a fixed manner, there are disadvantages in that a length of the optical cable desired by a customer needs to be grasped in advance, and stock management is relatively difficult. Accordingly, most optical module manufacturers perform stock management only using optical transceivers, and respond to demands for the active optical cables by attaching and fixing the optical cable to a pair of optical transceivers. Accordingly, yield and productivity of the active optical cables are inevitably worse than yield and productivity of the optical transceivers, and in order to respond to demands for the active optical cables, additional stock management of separate patch cords is required.

Accordingly, economical and convenient optical modules which allow optical transceivers and active optical cables to be manufactured without additional stock management elements while maximizing advantages of each of the optical transceivers and the active optical cables are required.

SUMMARY OF THE INVENTION

Problem to be Solved

Embodiments of the present disclosure are directed to providing economical and convenient optical modules which allow optical transceivers and active optical cables to be manufactured without additional stock management elements while maximizing advantages of each of the optical transceivers and the active optical cables.

[Means to Solve Problems]

According to one aspect of embodiments of the present disclosure, an optical module for a data center including: an optical engine unit optically coupled to a substrate, at least one optical element, at least one electronic element, and at least one optical fiber introduced from the outside to perform a function of transmitting and receiving an optical signal; an optical cable assembly including the at least one optical fiber to transfer the optical signal transmitted to and received from the at least one optical element to the outside; a body unit configured to fix and support portions of the optical engine unit and the optical cable assembly from below; and a housing coupled to the body unit to protect an upper portion of the optical engine unit is provided.

BRIEF DESCRIPTION OF THE SEVERAL VIEWS OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 illustrates an optical module for a data center according to one embodiment of the present disclosure;

FIG. 2 illustrates an optical cable assembly included in the optical module for a data center according to one embodiment of the present disclosure; and FIG. 3 is a view for describing a function of the optical cable assembly included in the optical module for a data center according to one embodiment of the present disclosure.

EFFECTS OF THE INVENTION

According to one embodiment of the present disclosure, there is an effect that economical and convenient optical modules which allow optical transceivers and active optical cables to be manufactured without additional stock management elements while maximizing advantages of each of the optical transceivers and the active optical cables can be provided.

DESCRIPTION OF SPECIFIC EMBODIMENTS OF THE INVENTION

Hereinafter, an optical module for a data center according to embodiments of the present disclosure will be described in detail with reference to the accompanying drawings. In the following drawings, the same reference numerals refer to the same components, and in the drawings, the size of each component may be exaggerated for clarity and convenience of the description.

Further, embodiments to be described below are only exemplary, and various modifications are possible from these embodiments. Hereinafter, the term disclosed as "on" or "above" may include not only "directly on" with contact but also "on" without contact.

A singular form also includes a plural form, unless the context clearly indicates otherwise. Further, a case in which a part "includes" a certain component refers to a case in which other components may be further included, rather than excluding other components, unless otherwise disclosed.

Use of the term "the" and similar indicating terms may correspond to both the singular form and the plural form. When there is no explicit disclosure of an order or an opposite disclosure for operations constituting a method, these operations may be performed in any suitable order, and are not necessarily limited to the disclosed order.

Further, a term such as "unit", "member", "member", "module", or the like disclosed in the specification refer to a unit which processes at least one function or operation, and this may be implemented as hardware or software, or a combination of hardware and software.

Further, connection or connection members of lines between components shown in the drawings exemplarily represent functional connections and/or physical or circuit connections, and in an actual device, may be referred to as various functional connections, physical connections, or circuit connections which may be replaced or added.

Use of all examples or exemplary terms is simply provided to describe technical ideas in detail, and the scope is not limited by these examples or exemplary terms unless limited by the claims.

FIG. 1 illustrates an optical module for a data center according to one embodiment of the present disclosure.

Referring to FIG. 1, an optical module for a data center 1000 according to one embodiment of the present disclosure includes an optical cable assembly 100, an optical engine unit 200, and a housing 300.

The optical module for a data center 1000 serves to receive an electrical signal from the outside to convert the electrical signal to an optical signal and transfer the optical signal to the outside through an optical waveguide. Further, the optical module for a data center 1000 receives the optical signal from the outside to convert the optical signal to the electrical signal and transfer the electrical signal to an external network device (not shown). Here, network equipment includes devices such as a switch, a server, a storage, and the like.

The optical cable assembly 100 includes an optical waveguide for transmitting and receiving optical signals, a structure for protecting the optical waveguide, and an additional structure for supporting and fixing a cable including the optical waveguide.

The optical engine unit 200 performs functions of converting an electrical signal to an optical signal and converting the optical signal to the electrical signal. To this end, the optical engine unit 200 includes various types of optical elements and electronic elements. Further, the optical engine unit 200 includes a substrate to support the various types of optical elements and electronic elements. The optical elements included in the optical engine unit 200 are optically coupled to at least one optical fiber introduced from the outside to transmit and receive the optical signal with the outside.

The housing 300 may be formed according to specifications determined by implementation agreements or standards. The housing 300 is formed of a metal material to perform a function of protecting the optical engine unit 200 from the outside, and dissipates heat generated from the optical engine unit 200 to the outside.

Further, the housing 300 includes a body unit (not shown) which entirely or partially fixes and supports the optical cable assembly 100 and the optical engine unit 200 from below, and further includes a cover unit (not shown) coupled to the body unit to protect an upper portion of the optical engine unit 200.

FIG. 2 illustrates an optical cable assembly included in the optical module for a data center according to one embodiment of the present disclosure.

Referring to FIG. 2, the optical cable assembly 100 includes at least one optical fiber to transfer an optical signal transmitted to and received from at least one optical element to the outside.

The optical cable assembly 100 includes a jacket unit 111, a buffer material 113, and at least one optical fiber 115 in order from the outside. The optical fiber is a medium for transmitting and receiving an optical signal of a preset condition, and may be formed of a material which is transparent for a wavelength band of the optical signal, and may be manufactured using glass or synthetic resin.

The jacket unit 111 performs a function of protecting the buffer material 113 and the optical fiber 115 while surrounding the buffer material 113 and the optical fiber 115 from the outside, and forms a space which allows the buffer material 113 to be located at the outside of the optical fiber 115. The buffer material 113 performs a function of protecting the optical fiber 115 while surrounding the optical fiber 115 from the outside, and serves to protect the optical fiber 115 from an external impact which was not absorbed by the jacket unit 111.

The optical cable assembly 100 includes a first cable support assembly 122 and a ring 126 which are structures which help the buffer material 113 to be entirely or partially fixed and supported in the housing 300 so that, for example, at least one optical fiber 115, in which the jacket unit 111 is optically coupled to the optical engine unit 200, does not receive a force in an outward (outside) direction even when the jacket unit 111 moves by receiving the force from the outside.

The first cable support assembly 122 includes a hollow unit through which a cable unit passes. One surface having the hollow unit includes a protrusion (not shown) having a female screw thread to be screw-coupled to the ring 126 and fixed.

In the optical cable assembly 100, when the ring 126 and the protrusion are screw-coupled and fixed, the buffer material 113 is fixed by the ring 126 in a state of being folded in an opposite direction where the protrusion is present. In this case, since the buffer material 113 supports and receives an external impact or force in place of the optical fiber 115, the optical fiber 15 may be protected from the external impact or force. Here, the buffer material 113 may include several strands of synthetic fibers, and may be coupled to and supported by the first cable support assembly 122 and the housing 300.

Further, the first cable support assembly 122 may be manufactured to have the same size as a multi-fiber push on (MPO) accommodator which may be assembled as an MPO type connector is fitted.

FIG. 3 is a view for describing a function of the optical cable assembly included in the optical module for a data center according to one embodiment of the present disclosure.

Referring to FIG. 3, the optical cable assembly 100 may be used for arranging and binding the buffer material 113 for convenience of a manufacturing process. FIG. 3A illustrates a process of bending the buffer material 113 in an opposite direction where the optical fiber 115 is present and arranging the buffer material 113 toward the first cable support assembly 122, and FIG. 3B illustrates a case in which the buffer material 113 is completely arranged toward the first cable support assembly 122, and then the ring 126 is coupled to the screw thread formed on the protrusion of the first cable support assembly 122 to be physically fixed.

EXPLANATION OF NUMBER

100: optical cable assembly
111: jacket unit
113: buffer material
115: optical fiber
122: first cable support assembly
124: second cable support assembly
126: ring
200: optical engine unit
300: housing
1000: optical module for a data center

What is claimed is:

1. An optical module for a data center comprising:
   an optical engine unit optically coupled to a substrate, at least one optical element, at least one electronic element, and at least one optical fiber introduced from the outside to perform a function of transmitting and receiving an optical signal;
   an optical cable assembly including the at least one optical fiber to transfer the optical signal transmitted to and received from the at least one optical element to the outside;
   a body unit configured to fix and support portions of the optical engine unit and the optical cable assembly from below; and
   a housing coupled to the body unit to protect an upper portion of the optical engine unit,
   wherein the optical cable assembly includes an optical cable unit having at least one optical fiber, a buffer material for protecting the at least one optical fiber from an external impact, and a jacket unit configured to block and protect the at least one optical fiber and the buffer material from the outside,
   wherein the optical cable assembly includes a first cable support assembly and a ring which are structures configured to help the buffer material to be entirely or partially fixed and supported in the housing so that an external force is not applied to the at least one optical fiber optically coupled to the optical engine unit when the external force is applied to the jacket unit, and
   wherein the first cable support assembly includes a hollow unit through which the cable unit passes and a protrusion having a female screw thread formed on one surface having the hollow unit to be screw-coupled to the ring and fixed.

2. The optical module of claim 1, wherein, in the cable assembly, when the ring and the protrusion are screw-coupled and fixed, the buffer material is fixed by the ring in a state of being folded in an opposite direction where the protrusion is present.

3. The optical module of claim 2, wherein the buffer material includes several strands of synthetic fibers, and is coupled to and supported by the first cable support assembly and the housing.

4. The optical module of claim 1, wherein the first cable support assembly has the same size as a multi-fiber push on (MPO) accommodator which is assembled as an MPO type connector is fitted.

* * * * *